(12) United States Patent
Govindarajan et al.

(10) Patent No.: US 11,327,979 B2
(45) Date of Patent: *May 10, 2022

(54) RANKING SEARCH RESULTS USING HIERARCHICALLY ORGANIZED MACHINE LEARNING BASED MODELS

(71) Applicant: salesforce.com, inc., San Francisco, CA (US)

(72) Inventors: Jayesh Govindarajan, Palo Alto, CA (US); Nicholas Beng Tek Geh, San Carlos, CA (US); Ammar Haris, Lake Forest Park, WA (US); Zachary Alexander, Snoqualmie, WA (US); Scott Thurston Rickard, Jr., Bellevue, CA (US); Clifford Z. Huang, Seattle, WA (US)

(73) Assignee: salesforce.com, inc., San Francisco, CA (US)

( * ) Notice: Subject to any disclaimer, the term of this patent is extended or adjusted under 35 U.S.C. 154(b) by 203 days.

This patent is subject to a terminal disclaimer.

(21) Appl. No.: 16/708,925

(22) Filed: Dec. 10, 2019

(65) Prior Publication Data

US 2020/0117671 A1 Apr. 16, 2020

Related U.S. Application Data

(63) Continuation of application No. 15/730,660, filed on Oct. 11, 2017, now Pat. No. 10,552,432.
(Continued)

(51) Int. Cl.
*G06F 16/00* (2019.01)
*G06F 16/2457* (2019.01)
(Continued)

(52) U.S. Cl.
CPC .... *G06F 16/24578* (2019.01); *G06F 16/2457* (2019.01); *G06F 16/90324* (2019.01);
(Continued)

(58) Field of Classification Search
CPC ........... G06F 16/24578; G06F 16/2457; G06F 16/90324; G06F 16/90348; G06N 20/20; G06N 20/00
See application file for complete search history.

(56) References Cited

U.S. PATENT DOCUMENTS

| 7,480,640 B1 | 1/2009 | Elad et al. |
| 10,248,663 B1 | 4/2019 | Keisler et al. |

(Continued)

OTHER PUBLICATIONS

Abadi et al., TensorFlow: Large-Scale Machine Learning on Heterogeneous Distributed Systems. (Year: 2015).*
(Continued)

*Primary Examiner* — Syed H Hasan
(74) *Attorney, Agent, or Firm* — Fenwick & West LLP

(57) ABSTRACT

A multi-tenant system stores a hierarchy of machine-learned models, wherein each machine-learned model is configured to receive as input a set of search results and generate as output scores for ranking the set of search results. Each machine-learned model is associated with a set of dimensions. The system evaluates search query performance. Performance below a threshold causes a new model to be generated and added to the hierarchy of models. Upon execution of a new search query associated with the same set of dimensions as the newly created model, the new model is used to rank that search query's search results.

20 Claims, 9 Drawing Sheets

Related U.S. Application Data

(60) Provisional application No. 62/407,441, filed on Oct. 12, 2016.

(51) Int. Cl.
*G06F 16/9032* (2019.01)
*G06F 16/903* (2019.01)
*G06N 20/00* (2019.01)
*G06N 20/20* (2019.01)

(52) U.S. Cl.
CPC ....... *G06F 16/90348* (2019.01); *G06N 20/00* (2019.01); *G06N 20/20* (2019.01)

(56) References Cited

U.S. PATENT DOCUMENTS

| | | | |
|---|---|---|---|
| 2007/0005568 A1* | 1/2007 | Angelo | G06F 16/9535 |
| 2008/0256069 A1* | 10/2008 | Eder | G06Q 90/00 |
| 2010/0169339 A1 | 7/2010 | Junqueira et al. | |
| 2012/0078825 A1* | 3/2012 | Kulkarni | G06F 16/24578 706/12 |
| 2012/0158685 A1* | 6/2012 | White | G06F 16/9535 707/706 |
| 2014/0279743 A1 | 9/2014 | Coalson | |
| 2015/0227619 A1* | 8/2015 | Xie | G06F 16/958 707/706 |
| 2015/0242761 A1 | 8/2015 | Amershi et al. | |
| 2015/0347585 A1 | 12/2015 | Klotz | |
| 2016/0098618 A1 | 4/2016 | Shaji et al. | |
| 2016/0124958 A1 | 5/2016 | Sinha et al. | |
| 2016/0132596 A1 | 5/2016 | Harris et al. | |
| 2017/0249311 A1 | 8/2017 | Pelleg et al. | |
| 2017/0344555 A1* | 11/2017 | Yan | G06Q 50/01 |
| 2018/0039731 A1 | 2/2018 | Szeto | |
| 2018/0115598 A1 | 4/2018 | Shariat et al. | |
| 2018/0227585 A1 | 8/2018 | Wang et al. | |
| 2018/0349477 A1 | 12/2018 | Jaech et al. | |
| 2019/0073607 A1 | 3/2019 | Jia et al. | |
| 2019/0180171 A1 | 6/2019 | Ott et al. | |

OTHER PUBLICATIONS

Farabet et al., Learning Hierarchical Features for Scene Labeling. (Year: 2013).*

Steinberg et al. Tree Ensembles and Extensions An Overview of TreeNet®, Random Forests® ISLE™ Model Compression & RuleLearner™. (Year: 2013).*

Steinberg et al. Evolution of Classification: From Logistic Regression and Decision Trees to Bagging/Boosting and Uplift Modeling. (Year: 2015).*

Bermudez-Chacon, et al., "Automatic problem-specific hyperparameter optimization and model selection for supervised machine learning: Technical Report," 2015, pp. 1-42.

Karmaker Santu, S. K. et al., "On Application of Learning to Rank for E-Commerce Search," SIGIR, Aug. 2017, pp. 1-11.

Li, H., "A Short Introduction to Learning to Rank," IEICE Trans. Inf. & Syst., vol. E94-D, No. 10, Oct. 2011, pp. 1-9.

* cited by examiner

|  | Accounts 406 | Contacts 408 | Cases 410 |
|---|---|---|---|
| Company X 404 | Account ABC 412 | John Smith 414 | UI Bug 416 |
| Company Y 402 | Account DEF 418 | Jane Doe 420 | Late Delivery 422 |

RANKING SEARCH RESULTS USING HIERARCHICALLY ORGANIZED MACHINE LEARNING BASED MODELS

CROSS-REFERENCE TO RELATED APPLICATIONS

This application is a continuation of U.S. application Ser. No. 15/730,660, filed Oct. 11, 2017, which claims the benefit of U.S. Provisional Application No. 62/407,441, filed Oct. 12, 2016 which is incorporated by reference herein.

BACKGROUND

1. Field of Art

This invention pertains in general to ranking search results and in particular to using hierarchically organized machine-learned models for ranking search results in an enterprise search system.

2. Description of the Related Art

Online systems often store large amount of data for enterprises. An online system may store data for a single enterprise or for multiple enterprises. For example, a multi-tenant system stores data for multiple tenants, each tenant potentially representing an enterprise. The data stored by an online system for an enterprise includes records representing various entities associated with the entity, for example, user accounts, tasks and projects, documents, communications between users, media objects, and so on. One common problem encountered by users of such online systems is to search for information. Online system typically provide search functionality, for example, based on an enterprise search engine. Online systems aim to effectively identify and rank search results representing information that a user is searching for, so as to present the user with the most relevant information.

For a search query, the order in which search results are presented to the user is significant when judging the effectiveness of the search engine used to generate the search results from the search query. For example, presenting search results in order of relevance allows the user to quickly identify the search results that the user is interested in. In contrast, poor ranking of search results provides poor user experience since the user is required to scroll through and manually review several results before identifying the relevant search results. Conventional techniques use various criteria for ranking search results. However, different users often have different priorities when searching. For example, some users prefer search results with high recall, while others may prefer search results with high precision. As another example, an engineer may find different results relevant as compared to an executive, even though they provide the same search query. Search engines provide the same ranking for search results presented to different types of users, thereby either providing a mediocre user experience to all users or good user experience to some users and poor user experience to other users.

As another example, a multi-tenant system stores data for different organizations. Users from different organizations may have different search result priorities. For example, users from a particular organization may prefer results with high recall, whereas users from another organization may prefer results with high precision. Furthermore, different groups of users from within the same organization may have different search result preferences. As such, a single search engine model will often be insufficient to meet the specific needs of all users within an organization or users associated with different organizations in a multi-tenant system.

BRIEF DESCRIPTION OF DRAWINGS

The disclosed embodiments have advantages and features which will be apparent from the detailed description, the appended claims, and the accompanying figures (or drawings). A brief introduction of the figures is below.

FIG. 4 is a simplified illustrative example of a multi-tenant data table as part of an online system, according to one embodiment.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

A multi-tenant online system stores data of one or more organizations and provides tools that provide valuable information to users of organizations, including users who may act as searchers who search data stored by the online system by creating search queries. The tools provided by the online system give interactivity with objects representing entities associated with organizations, for example, objects storing information associated with the entity "Accounts" of a specific organization, objects storing potential transactions as entity "Opportunity", or objects representing documents stored in a knowledge store. The online system uses machine-learned models to rank search results for search queries on one or more entities associated with the organizations of the users who provide the search queries. Users of organizations could perform search across certain entities associated with the organizations, such as a sales development representative working for company X creating a certain search query for all his sales leads developed in the past six months. Each search query is associated with one or more dimensions that specify a context of the query, for example, the type of entity across which the search is performed, the organization associated with the user performing the search, or a group of the user within the organization. In the above example the search query would be associated with at least the dimensions of organization (company X) and entity type (sales leads).

The online system stores a hierarchy of a plurality of machine-learned models for ranking search results. The online system determines the dimensions of an input search query received. The online system selects the correct model based on the dimensions of the input search query. Dimensions include considerations such as the organization associated with the searcher and the entity being searched. By maintaining a hierarchy of models and using said hierarchy to apply the correct ranking model to search results, the online system is able to better rank search results in a manner the searcher implicitly desires them to be ranked. Accordingly, the online system may rank results of the same search query using different ranking criteria, depending on the dimensions associated with each invocation of the search query.

Computing Environment

Figure 1:
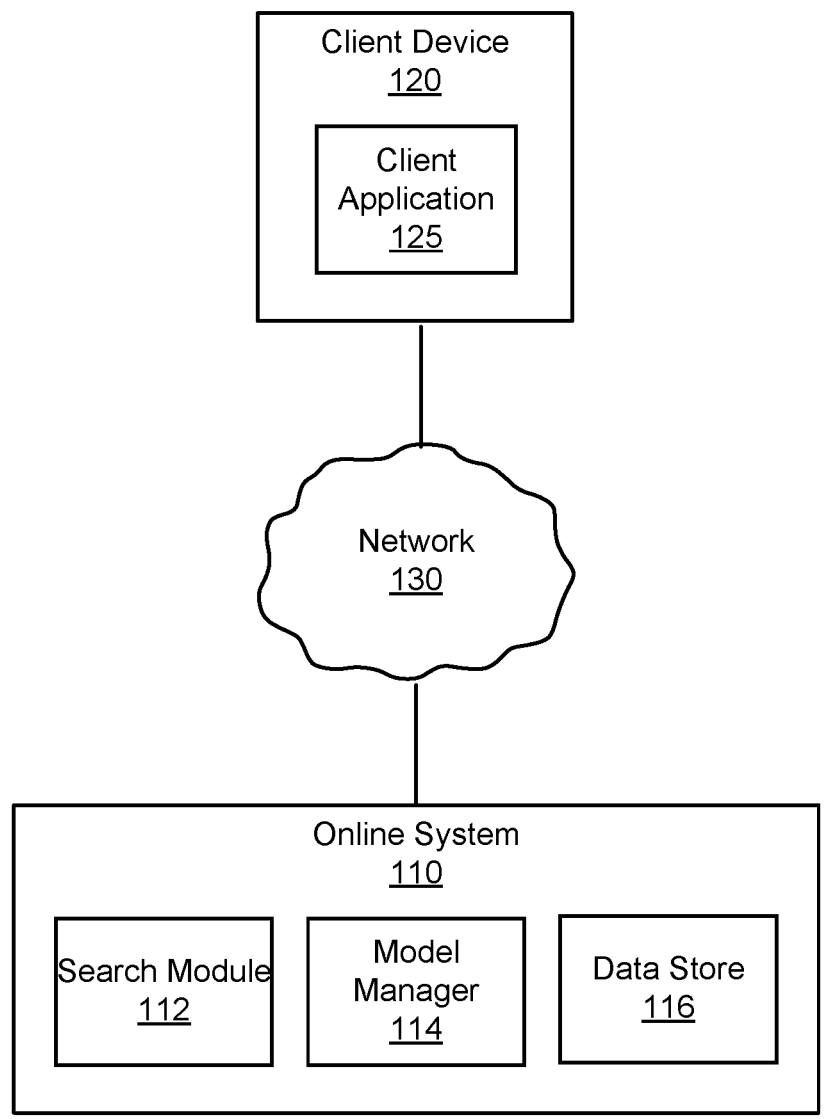
FIG. 1 is a high-level block diagram of a computing environment for ranking search results based on a hierarchy of machine learning based ranking models, according to one embodiment.

FIG. 1 is a high-level block diagram of a computing environment 100 for ranking search results based on hierarchy of machine learning based ranking models, according to one embodiment. The overall computing environment 100 includes an online system 110 and one or more clients 120 connected by a network 130. Other embodiments may use more or less or different systems than those illustrated in FIG. 1. Functions of various modules and the systems described herein can be implemented by other modules and/or systems than those described herein.

FIG. 1 and the other figures use like reference numerals to identify like elements. A letter after a reference numeral, such as "135a," indicates that the text refers specifically to the element having that particular reference numeral. A reference numeral in the text without a following letter, such as "135," refers to any or all of the elements in the figures bearing that reference numeral (e.g. "135" in the text refers to reference numerals "135A" and/or "135B" in the figures).

The online system 110 includes a search module 112, a model manager 114, and a data store 116. The online system 110 stores information associated with one or more organizations which are "tenants" of the multi-tenant online system 110. In general, a multi-tenant system stores data for multiple organizations. The information stored in connection with a tenant in the online system 110 includes objects representing various entities associated with the tenant, for example, user accounts representing users, objects representing potential transactions, etc. The online system 110 provides functionality for users to interact with the information it stores, for example, the online system 110 provides search functionality which a specific user of a specific tenant may use to search a specific entity of that tenant for certain data. Furthermore the online system 110 allows for the addition, removal, and manipulation of the data it stores according to rules depending upon the particular embodiment. In the interest of information security, multi-tenant systems such as the online system 110 partition data by organization, preventing users of one organization from accessing data of different organizations.

As an example, one tenant might be a company that employs a sales force where each salesperson uses a client device 120 to manage their sales process. Thus, a user might maintain contact data, leads data, customer follow-up data, performance data, goals and progress data, etc., all applicable to that user's personal sales process.

In one embodiment, online system 110 implements a web-based customer relationship management (CRM) system. For example, in one embodiment, the online system 110 includes application servers configured to implement and execute CRM software applications as well as provide related data, code, forms, webpages and other information to and from client devices 120 and to store to, and retrieve from, a database system related data, objects, and webpage content.

With a multi-tenant system, data for multiple tenants may be stored in the same physical database, however, tenant data typically is arranged so that data of one tenant is kept logically separate from that of other tenants so that one tenant does not have access to another tenant's data, unless such data is expressly shared. In certain embodiments, the online system 110 implements applications other than, or in addition to, a CRM application. For example, the online system 110 may provide tenant access to multiple hosted (standard and custom) applications, including a CRM application. According to one embodiment, the online system 110 is configured to provide webpages, forms, applications, data and media content to client devices 120 to support the access by client devices 120 as tenants of online system 110. As such, online system 110 provides security mechanisms to keep each tenant's data separate unless the data is shared.

A multi-tenant system may implement security protocols that keep data, applications, and application use separate for different tenants. In addition to user-specific data and tenant-specific data, the online system 110 may maintain system level data usable by multiple tenants or other data. Such system level data may include industry reports, news, postings, and the like that are sharable among tenants.

It is transparent to member users of organizations that their data may be stored in a table that is shared with data of other organizations. A database table may store data for a plurality of organizations. Accordingly, in a multi-tenant system various elements of hardware and software of the system may be shared by one or more organizations. For example, the online system 110 may execute an application server that simultaneously processes requests for a number of users of different organizations.

The online system 110 receives search queries from users via the client device 120 over the network 130. The search module 112 manages these search queries and determines search results to return to the client device 120 for display. When search queries are received, the online system 110 directs them to the search module 112 which processes the search queries and determines search results comprising objects that match search criteria of each search query of the search queries. The method for determining search results depends upon the embodiment, though typically it comprises comparing search terms provided in a search query to keywords occurring in a set of objects being searched. For each given search query, the objects acting as search results are specific to the organization associated with the user who created the search query. The online system 110 sends search results to the client device 120 in a ranked order determined by applying a ranking model to the search results. The ranking model used for a given search query is dependent upon the dimensions of the given search query, and is chosen by the model manager 114.

The online system 110 evaluates the performance of models by any of a variety of methods. For example, the online system 110 may track which search results the user selects upon being presented with a ranked list of search results. Alternatively, the online system 110 may receive explicit user feedback providing a rating of the search results presented to the user. If the online system 110 determines the model did not perform as well as desired, it may prompt the model manager 114 to create a new model to better rank search results for search queries similar to the one which led to subpar ranking. The creation of new models may involve machine learning, depending upon environment.

The model manager 114 manages the online system's 110 creation and use of models, especially ranking models. When the search module 112 has determined search results for a certain search query, it prompts the model manager 114 to identify the correct model for use in ranking search results. The model manager 114 identifies the dimensions associated with the search query and uses those dimensions to identify the best matching model. In an embodiment, individual models are stored in the data store 116 and the model manager 114 maintains a hierarchy of models. The hierarchy of models is used to determine and fetch for the search module 112 the appropriate model.

The hierarchy of models has a structure wherein models have a specific place, and a process by which a specific model in that structure is chosen for the search engine. The structure of the hierarchy of models may comprise one or more levels, each level associated with a set of dimensions describing search queries, with models located within the structure depending on the set of dimensions that model is built to rank search results for. For example, if a certain model has been constructed to rank search results for a certain organization, then that model may be placed in the level of the hierarchy of models associated with a set of dimensions comprising the dimension of organization. The process for choosing a model from the hierarchy of models may include determining the most specific model possible for the search query.

For example, the search module 112 may receive a first search query upon a first entity by a first user who is a member of a first organization and thus prompt the model manager 114 for a model. The model manager 114 will navigate the hierarchy of models to identify the correct model for use. If the hierarchy of models contains different models for ranking search results based on the dimension of entity, the dimension of organization, or the dimensions of entity and organization, it may choose the model based on the dimensions of entity and organization, as it is the most specific model that may be associated with the first search query and hence is the most likely to provide the ranking of search results desired by the first user. In this example, the model for ranking search results based on the dimension of entity, the model for ranking search results based on the dimension of tenant, and the model for ranking search results based on the dimensions of entity and tenant may exist in different levels of the hierarchy of models, due to their differing associated sets of dimensions. Once the model manager 114 has provided a model for use by the search module 112 and search results have been ranked, ranked search results are sent to the client device 120 who prompted the search query over the network 130.

If the search module 112 determines a model to be subpar, it prompts the model manager 114 to create a new model. The model manager 114 does so using machine learning techniques and training data in the data store 116, depending upon embodiment. Once a new model has been created, the model manager 114 places it into a level of the hierarchy of models. If there is not yet a level associated with the set of dimensions associated with the new model, then the model manager 114 creates a new level associated with that set of dimensions and places the new model in that level.

The data store 116 stores data for the online system 110 in a typical manner for multi-tenant systems as described supra. When determining search results for a given search query, the search module 112 searches objects stored in the data store 116. The objects searched for search queries are associated with the organization of the user who created the search query, thus maintaining data security among organizations. The data store 116 also stores the models which comprise the hierarchy of models. Unlike organization-specific data, models may be stored collectively. For example, a model for use when searching a specific entity may be applied to search queries from users of different organizations; the model will simply apply to different organization-specific subsets of data within the data store 116. Furthermore the data store 116 stores training data for use in training new models.

The client device 120 is an electronic device used by the user to perform functions such as executing software applications for various purposes and consuming electronic content such as content hosted by web servers on the network 130. For example, the client may be a smart phone, or a tablet or notebook computer, or some other personal computer. The client device 120 includes a display on which the user may view content such as the content hosted by web servers on the network 130. In addition, the client device 120 includes a user interface (UI), such as physical and/or on-screen buttons, which the user may interact with to perform various functions with the client.

The client device 120 includes a client application 125. Depending upon the embodiment, the client application 125 may be integrated into the operating system or other software executing on the client device 120.

The client application 125 runs on the client device 120 and allows the user to interact with the online system 110 via the network 130. The interactions permitted by the client application 125 include searching data stored by the online system 110. An example of the client application 125 is a browser application. In an embodiment, the client application 125 interacts with the online system 110 using requests sent over the network 130. The client application 125 is capable of both sending data to and receiving data from the online system 110. The client application 125 may use the display of the client device 120 to present content to the user.

The network 130 enables communications between clients 120 and the online system 110 and can comprise the Internet as well as mobile telephone networks. In one embodiment, the network 130 uses standard communications technologies and/or protocols. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. The messages exchanged by the one or more clients 120 and the online system 110 can also be encrypted. The entities can use custom and/or dedicated data communications technologies instead of, or in addition to, the ones described above. The online system 110 may connect to a plurality of clients 120 using one or more networks 130 which may use differing technologies to enable interconnectivity depending upon embodiment. The techniques disclosed herein can be used with any type of communication technology, so long as the communication technology supports receiving by the online system 110 of requests from a sender, for example, a client device 110 and transmitting of results obtained by processing the request to the sender.

System Architecture

Figure 2:
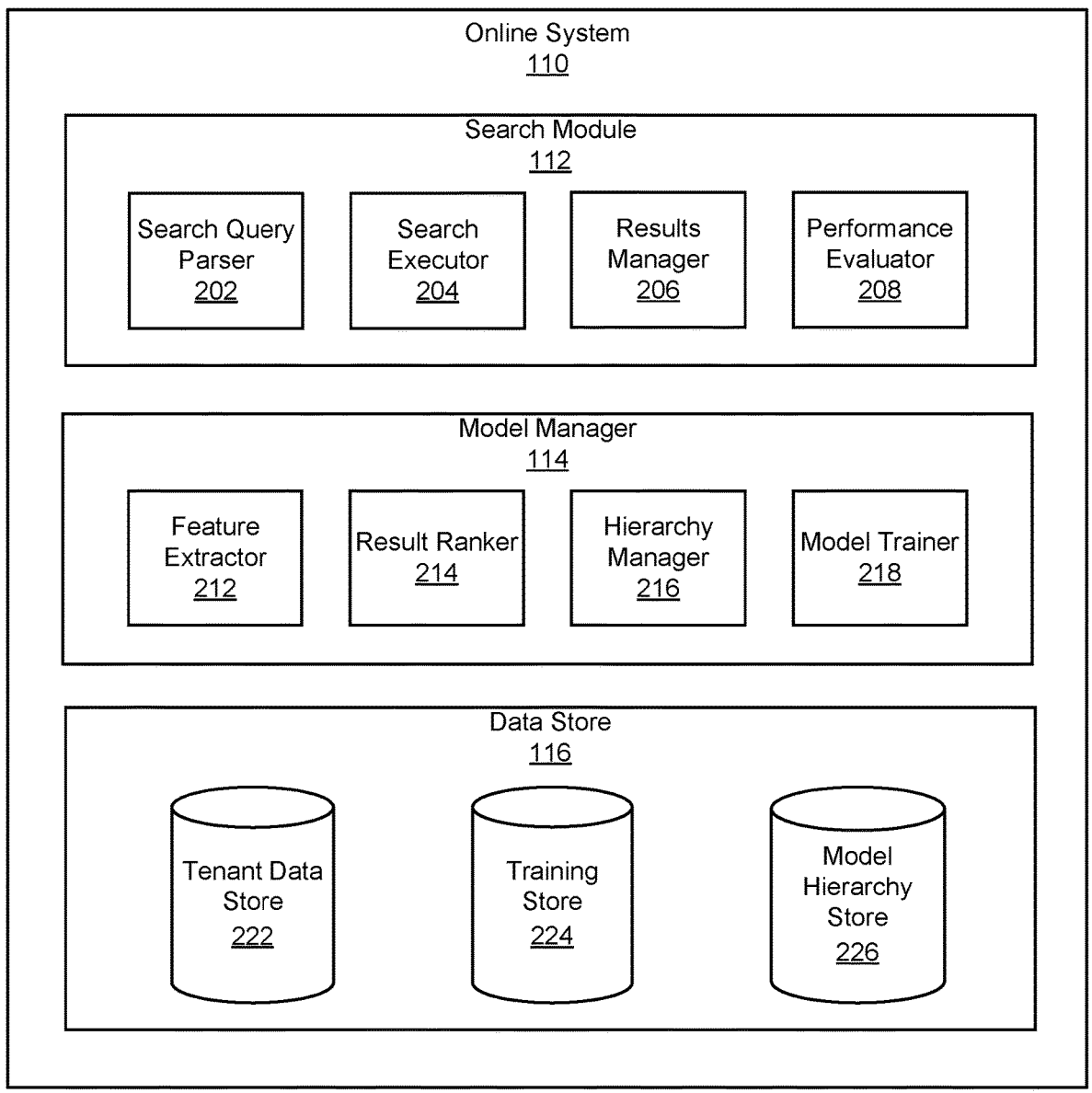
FIG. 2 is a high-level block diagram of an online system as part of a computing environment for ranking search results based on a hierarchy of machine learning based ranking models, according to one embodiment.

FIG. 2 is a high-level block diagram of an online system 110 for ranking search results based on a hierarchy of machine learning based ranking models, according to one embodiment. As shown in FIG. 2, the online system 110 includes the search module 112, the model manager 114, and the data store 116. For the sake of brevity, the detailed description of such components shall not be repeated where it has already been detailed supra. Those of skill in the art will recognize that other embodiments of the online system 110 can have different and/or other modules than the ones described here, and that the functionalities can be distributed among the modules in a different manner.

The data store 116 comprises a tenant data store 222, a training data store 224, and a model hierarchy store 226. Each store of the data store 116 may exist in separate physical locations in memory or as parts of one physical memory space, depending upon embodiment. At least the tenant data store 222 is a multi-tenant store, with the data of a plurality of organizations being stored in the same store.

The information stored in connection with an organization in the tenant data store 222 includes objects representing various entities associated with the organization and information pertaining to specific user accounts of members of that organization. An organization may be a business, a company, a club, a social group, etc. An object may represent an account representing a business partner or potential business partner (e.g. a client, vendor, distributor, etc.) of a user, and may include attributes describing a company, subsidiaries, or contacts at the company. As another example, an object may represent a project that a user is working on with an existing partner, or a project that the user is trying to get. An object may represent an account representing a user or another entity associated with the organization. For example, an account may represent a customer of the first organization. An object may represent a user of the online system. An object may represent a potential transaction of an organization, also referred to as an opportunity object.

In an embodiment, the tenant data store 222 stores an object as one or more records in a database. An object has data fields that are defined by the structure of the object (e.g. fields of certain data types and purposes). For example, an object representing an entity may store information describing the potential customer, a status of the opportunity indicating a stage of interaction with the customer, and so on.

The tenant data store 222 may be implemented as a relational database storing one or more tables. Each table contains one or more data categories logically arranged as columns or fields. Each row or record of a table contains an instance of data for each category defined by the fields. For example, a tenant data store 222 may include a table that describes a customer with fields for basic contact information such as name, address, phone number, fax number, etc. Another table might describe a purchase order, including fields for information such as customer, product, sale price, date, etc.

An object may include links or references to other objects. For example an opportunity object may include links to contact objects and account objects, an account object may include links to contact objects and so on. An object may have outgoing links that allow the object to refer to other objects as well as incoming links that allow other objects to refer to the object.

The tenant data store 222 may store historical information associated with various objects. The historical information is stored as records, each record storing an object identifier for identifying the object associated with the activity, for example, an identifier for a potential transaction object. In an embodiment, the online system 110 is configured to detect changes in attributes belonging to a set of attributes associated with objects. If the online system 110 detects a change in value in any attribute from the set of attributes, it stores a record describing the attributes of the object in the tenant data store 222. For example, for a potential transaction object, the online system 110 stores a record in the tenant data store 222 if there is a change in value of any attribute including the state of the potential transaction object, an amount of the object, a predicted likelihood of success of the potential transaction, and so on. In an embodiment, the online system 110 associates various attributes describing the object with the associated record.

Accordingly, the tenant data store may store activities associated with an object comprising, creation of the object, any state changes associated with the object, any user interactions associated with the object, any change in an amount associated with a potential transaction object, a change in the probability of a potential transaction object reaching a "closed won" state or a "closed lost" (if the change in the probability is more than a threshold value), a change in a predicted state that a potential transaction object is expected to close, and so on.

The training data store 224 stores data as training data sets for machine learning of models, such as search result ranking models. The stored data in the training data store 224 may comprise copies of records in the tenant data store 222. The training data may be organized by dimension type, to allow the model manager 114 to accurately generate new models for a specific set of dimensions by using training data associated with those dimensions. In some embodiments the training data store 224 may be a division of the tenant data store 222 rather than a discrete component.

The model hierarchy store 226 stores models used by the online system 110, namely, search result ranking models. As discussed supra, the model manager 114 places newly generated models in the hierarchy of models depending on the specific set of dimensions that model is built for. The hierarchy of models may take many different forms, but is generally in the form of a lattice-ordered set of models.

For example, a base model may be created which applies to all search queries. There may then be a second level of models specific to the dimension of organization, where a plurality of organizations have customized models. There may then be a third level of models specific to the dimension of entity, applying to any search queries upon the specific entity type a given model in this level is created with regards to. These second and third levels may conceptually reside in parallel or one may be conceptually higher than the other, depending upon embodiment. To continue this example, they may be parallel. A fourth level may comprise models associated with the dimensions of entity and organization, wherein a first model is associated with a first organization and a first entity, and a second model is associated with a second model and a second entity. They may both be associated with models in lower tiers, but may not be associated with each other, as they are associated with different organizations and entities. If however the first model and the second model were both associated with the first entity, then they would be associated on the level specific to the dimension of entity.

In one embodiment, the hierarchy of models may be stored out of order, with the model manager 114 maintaining a structure of the hierarchy, with ways to access the specific models from the structure without losing the order of the hierarchy.

The search engine 112 comprises a search query parser 202, a search executor 204, a results manager 206, and a performance evaluator 208. The search engine 112 may interact with the model manager 114 to complete any of the tasks described herein depending upon embodiment, whether mentioned explicitly or not.

When the online system 110 receives a search query from a client device 120, it is directed to the search engine 112, specifically the search query parser 202. The search query parser 202 parses various components of a search query. The search query parser 202 checks if the search query conforms to a predefined syntax. The search query parser builds a data structure representing information specified in the search query. For example, the search query parser 202 may build a parse tree structure based on the syntax of the search query. The data structure provides access to various components of the search query to other modules of the online system 110. In a multi-tenant system, the search query is associated with a specific organization.

The search query executor 204 executes the search query to determine the search results based on the search query. The search results determined represent the objects stored in the tenant data store 222 that satisfy the search criteria specified in the search query. Accordingly, the search query executor 204 develops a query plan for executing a search query. The search query executor 204 executes the query plan to determine the search results that satisfy the search criteria specified in the search query. As an example, a search query may request all objects of a particular object type that include certain search terms. The search query executor 204 identifies objects of the specified object type that include the search terms as specified in the search criteria of the search query. The search query executor 204 acts upon the tenant data store 222 when executing a search query, getting the objects it interacts with from the tenant data store 222.

The model manager 114 is used to perform various steps in the search process, namely, ranking search results. After search results have been ranked, they are sent from the model manager 116 to the results manager 206. The results manager 206 formats ranked search results for delivery to the client device 120 and interacts with the network 130 to transfer the ranked search results.

The performance evaluator 208 serves two general purposes. First, it receives and analyzes performance data from client devices 120 to determine the relative performance of a ranking model. Depending upon embodiment, one or more performance measurements may be used, such as recording which search results were interacted with by the user. If performance was measured to be lower than a threshold, the performance evaluator 208 prompts the model manager 208 to generate a new model for use with search queries with the same set of dimensions as the search query whose results prompted the performance evaluator 208 to request a new model.

The performance of a trained object ranking model may be evaluated using a validation set that was formed as a disjoint set of the data for testing the trained content ranking models to ensure the ranking model generalizes to non-training data. Common metrics applied in accuracy measurement include: Precision=TP I (TP+FP) and Recall=TP I (TP+FN), where precision is how many the content ranking model correctly guessed (TP or true positives) out of the total it predicted (TP+FP or false positives) and recall is how many it correctly guessed (TP) out of the total that did represent the concept (TP+FN or false negatives). The F score (F-score=2*PR/(P+R)) unifies the two into one measure, and the system can reject or iterate on the model as needed based on the accuracy measurement result.

The second general purpose of the performance evaluator 208 is to analyze the performance of new models when testing those models. In one embodiment, this analysis is done via A/B testing of the new model with one or more models which could also apply to search queries having the set of dimensions the new model was made to handle. If the new model outperforms existing models, the performance evaluator 208 requests the model manager 114 add it to the hierarchy of models. If performance of the new model is not superior to existing models, the performance evaluator 208 may request from the model manager 114 a new model for the same set of dimensions, or may request the model manager 114 not add the new model to the hierarchy of models.

The model manager 114 comprises a feature extractor 212, a result ranker 214, a hierarchy manager 216, and a model trainer 218. The model manager 114 interacts with both the search engine 112 and the data store 116 to create and apply ranking models to search results.

The feature extractor 212 extracts features of objects from a given set of objects and provides the extracted features to the result ranker 214. In an embodiment, the feature extractor 212 represents a feature using a name and a value. The features describing the objects may depend on the type of object. Some features may be independent of the type of the object and apply to all types of objects. Examples of features extracted by the feature extractor 212 include a time of the last modification of an object or the age of the last modification determined based of the length of time interval between the present time and the last time of modification.

Other examples of a feature extracted by the feature extractor 212 include a time of the last activity associated with an object or the age of the last activity associated with the object as determined based of the length of time interval between the present time and the time of the last activity associated with the object. An activity associated with an object may be a modification to the object, an access operation performed on the object, a link created to the object from another object, and so on. Another example of a feature extracted by the feature extractor 212 is a rate of activity associated with an object. The rate of activity may be measured based on a number of activity associated with the object in a unit time interval as determined by normalizing activities over a time period.

Another example of a feature extracted by the feature extractor 212 is a measure of the number of links associated with the object. The number of links associated with the object nay include the number of links from the object to other objects and number of links from other objects to this object.

The feature extractor 212 extracts object type specific features from certain objects. For example, if an object represents an opportunity or a potential transaction, the feature extractor 212 extracts a feature indicating whether an object representing an opportunity is closed or a feature indicating an estimate of time when the opportunity is expected to close. As another example, if an object represents a case, the feature extractor 212 extracts features describing the status of the case, status of the case indicating whether the case is a closed case, an open case, an escalated case, and so on.

The result ranker 214 determines a score for each search result based on the features associated with the search results. This is done by applying a model from the hierarchy of models to the features associated with the search results. The result ranker 214 requests the appropriate model from the hierarchy manager 216, which provides access to the model. After applying the correct model to the search results, the result ranker 214 sorts the search results in order of score, from highest, implying greatest likelihood of relevance, to lowest, implying least likelihood of relevance. After ranking the search results, the result ranker 214 provides the ranked search results to the results manager 206.

The hierarchy manager 216 interacts with the result ranker 214, the model hierarchy store 226, and the model trainer 218 to manage access to and order of models. The hierarchy manager 216 maintains the hierarchy of models, reorganizes the hierarchy when necessary, and determines where to place a new model when provided one by the model trainer 218. The hierarchy manager 216 creates new levels in the hierarchy when necessary. When the result ranker 214 requests a model, the hierarchy manager 216 identifies the correct model by the set of dimensions associated with the search query that prompted the result ranker 214 to request the model. Once the correct model has been identified by traversal of the hierarchy of models, the hierarchy manager 216 provides access to the correct model to the results ranker 214.

The model trainer 218 generates new models using machine learning. The model trainer 218 may train the models by extracting features from objects for which the ranking has already been determined and creating a feature vector, using data in the training store 224 which is extracted via the feature extractor 212. Dimensionality reduction (e.g., via linear discriminant analysis, principle component analysis, etc.) may be used to reduce the amount of data in the feature vector to a smaller, more representative core set of features. The model trainer 218 generates models for search queries associated with specific sets of dimensions.

The training set for the models that will be used is a subset of the overall data set that is representative of the data to be ranked, including positive and negative examples of the ranking of objects on which the model is being trained, and is found in the training store 224 and extracted by the feature extractor 212. In supervised training, rankings of example objects representing specific features are provided as training sets. The training process provides models that can then be used to rank objects that the model has not encountered before. Machine learning algorithms used include support vector machines (SVMs), boosting for other algorithms (e.g., AdaBoost), neural net, logistic regression, naive Bayes, memory-based learning, random forests, bagged trees, decision trees, boosted trees, boosted stumps, etc.

In an embodiment, the model trainer 218 uses random forest classification based on predictions from a set of decision trees. Each decision tree splits the source set into subsets based on an attribute value test. This process is repeated in a recursive fashion. A decision tree represents a flow chart, where each internal node represents a test on an attribute. For example, if the value of an attribute is less than or equal to a threshold value, the control flow transfers to a first branch and if the value of the attribute is greater than the threshold value, the control flow transfers to a second branch. Each branch represents the outcome of a test. Each leaf node represents a class label, i.e., a result of a classification.

Each decision tree uses a subset of the total predictor variables to vote for the most likely class for each observation. The final random forest score is based on the fraction of models voting for each class. A model may perform a class prediction by comparing the random forest score with a threshold value. In some embodiments, the random forest output is calibrated to reflect the probability associated with each class.

The weights of features for predicting relevance of different search queries with different sets of dimensions may be different. Accordingly, a different machine learning model may be trained for each set of dimensions and applied to search queries with the same set of dimensions.

Illustrative Examples

Figure 3A:
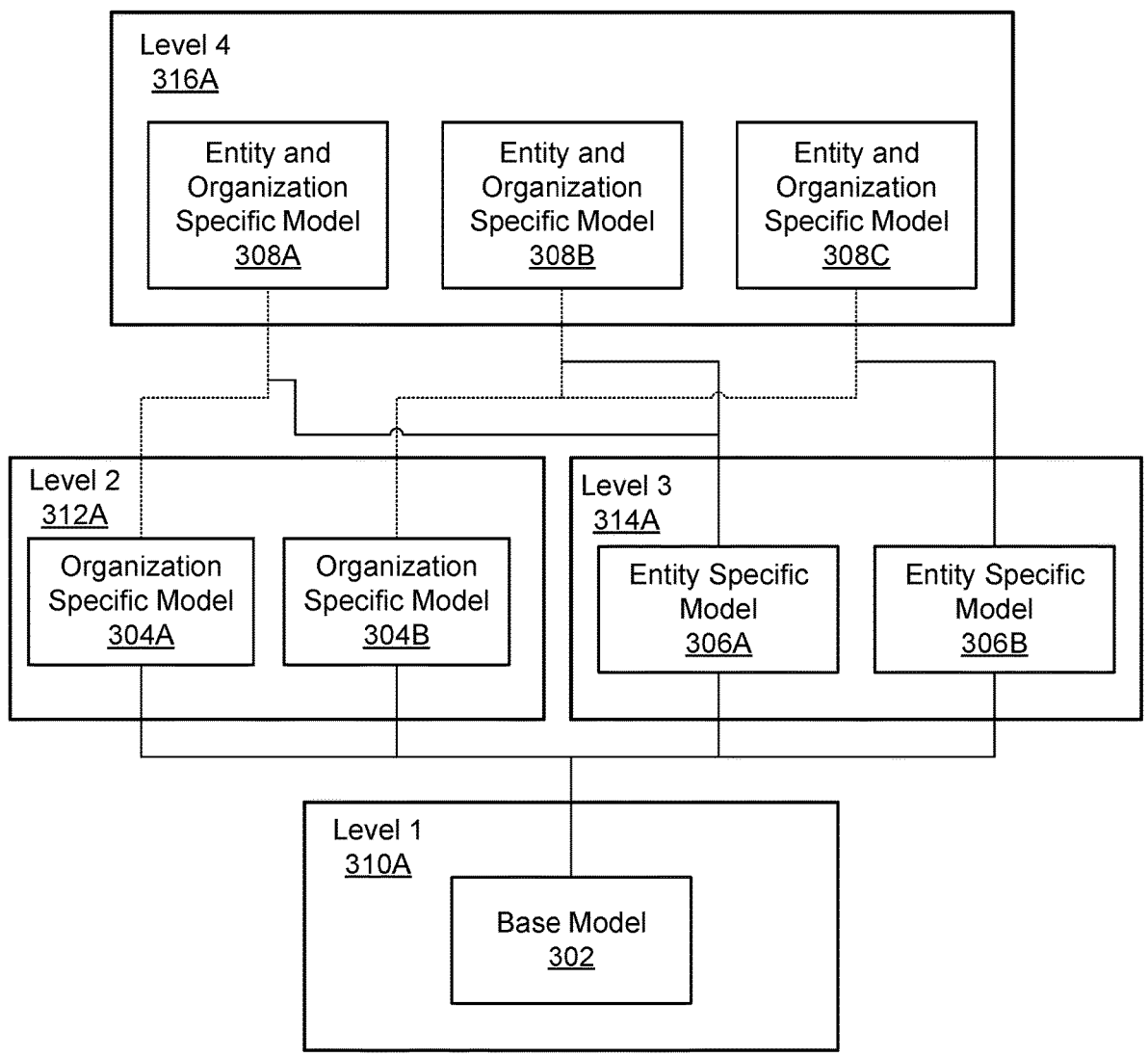
FIG. 3A is a diagram illustrating a hierarchical ranking model, according to one embodiment.

FIG. 3A is a diagram illustrating a hierarchical ranking model 300A, according to one embodiment. According to this embodiment there are four levels occupying three tiers of hierarchy precedence. The hierarchy illustrates the lattice ordered set property typical of the hierarchy. On the first tier is level 1 310A, comprising a base model 302. The base model 302 is not restricted by any set of dimensions, and can apply to all search queries and all sets of search results thereof.

The second tier is more specific than the first tier, comprising Level 2 312A and level 3 314A. level 2 312A comprises organization specific model 304A and organization specific model 304B while Level 3 314A comprises entity specific model 306A and entity specific model 306B. Each of level 2 312A and level 3 314A comprise models constrained by sets of dimensions with one dimension, the former having the dimension of organization, the latter having the dimension of entity. For example, organization specific model 304A could be specific to organization X, whereas organization specific model 304B could be specific to organization Y.

While all models in tier two are more specific than the base model, and thus may be chosen for a given set of search results over the base model, they do not necessarily ever outrank each other, displaying the lattice ordered nature of the set of models comprising the hierarchy. For a given set of search results with dimensions specific to multiple models of this tier, such as pertaining to the organization of organization specific model 304A and the entity of entity specific model 306A, if there is no more specific model to choose, then which of 304A and 306A to use could be determined by the historic performance of each model relative to each other, with the better performing model being used to rank results.

The third tier comprises level 4 316A which comprises entity and organization specific model 308A, 308B, 308C. All entity and organization specific models in this example are bound to the dimensions of entity and organization. Entity and organization specific model 308A corresponds to the entity of entity specific model 306A and the organization of organization specific model 304A. Entity and organization specific model 308B corresponds to the entity of entity specific model 306A and the organization of organization specific model 304B. Entity and organization specific model 308C corresponds to the entity of entity specific model 306B and the organization of organization specific model 304B.

Once again the lattice-ordered set property is observed on tier three. Also, each model at this tier is more specific than models in tier one or tier two, with a more specific set of dimensions. For example, where organization specific model 304A could be specific to the dimension of organization X, and entity specific model 306A could be specific to the dimension of entity Accounts, entity and organization specific model 308A would be specific to both organization X and entity Accounts, and hence only be used when Accounts is queried by a user from organization X. Being the most specific, this tier would be first to be used, if a model specific to a given query exists. Otherwise, a less specific model would be used. For example, a query upon the organization of organization specific model 304A and the entity of entity specific model 306B would require the use of one of those models, since there is no Entity and organization specific model 308 for that specific set of dimensions entity and organization.

Figure 3B:
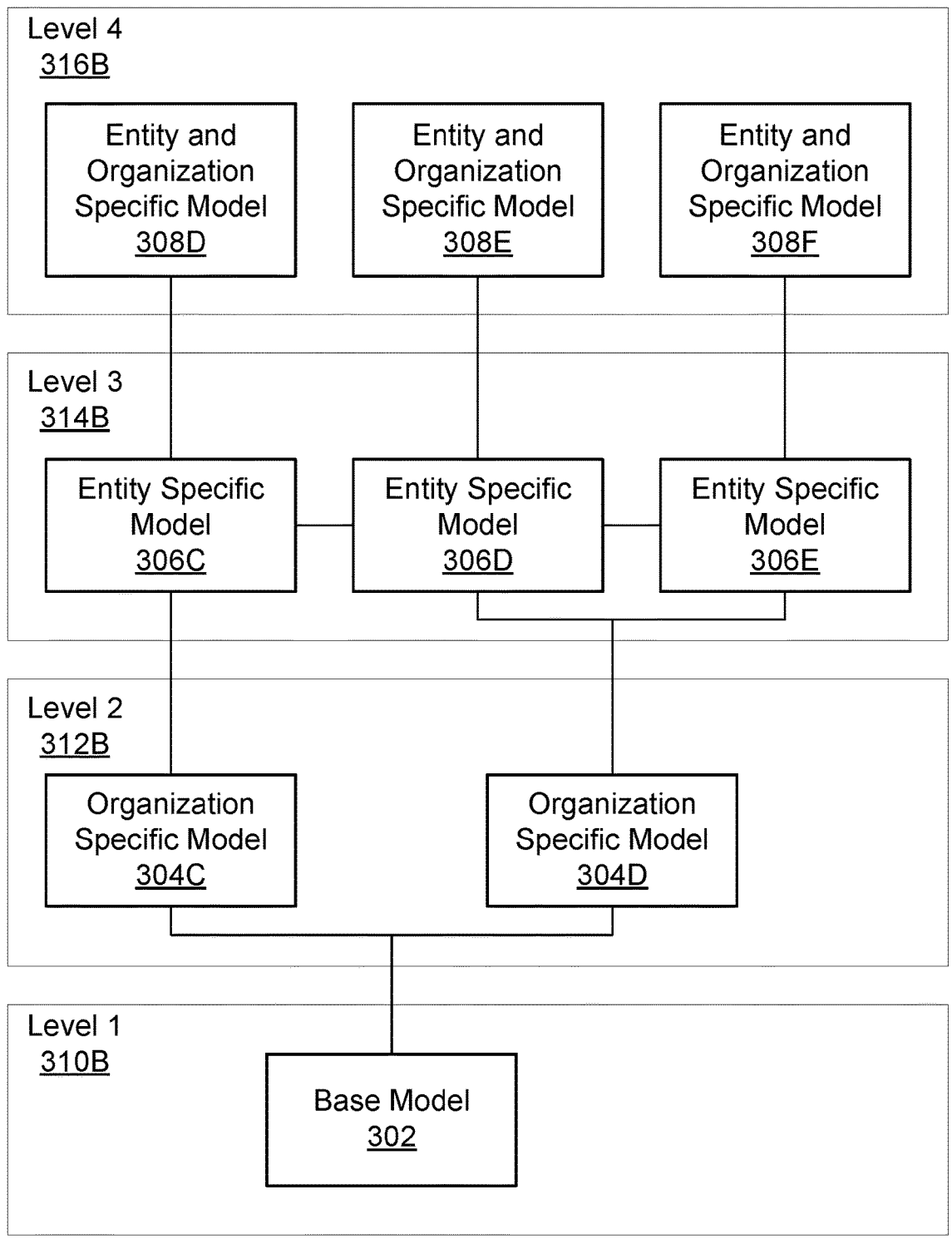
FIG. 3B is a diagram illustrating a hierarchical ranking model, according to a second embodiment.

FIG. 3B is a diagram illustrating a hierarchical ranking model, according to a second embodiment. In this embodiment, unlike in FIG. 3A, there are four tiers of precedence to the hierarchy 300B. The first tier comprises level 1 310B, which comprises base model 302 similar to FIG. 3A. Tier two comprises level 2 312B which comprises organization specific model 304C, 304D. These models, specific to the set of dimensions comprising organization, take precedence over the base model when applicable.

Tier three comprises level 3 314B which comprises entity specific model 306C, 306D, 306E. In this embodiment, these models take precedence to the models of tier two, meaning entity specific models 306 take precedence to organization specific models 304. This could be due to entity specific models 306 outperforming organization specific models 304 and thus the hierarchy being restructured to reflect that superiority via greater precedence to entity specific models 306. It is possible to access entity specific models 306 from each other when navigating the hierarchy as moving to this level from level 2 312B may not lead directly to the desired entity specific model 306C. For example, while navigating the hierarchy and taking the path of organization specific model 304C, if the proper entity specific model 306 is entity specific model 306D, rather than entity specific model 306C, it is possible to navigate from the one to the other.

Tier four comprises level 4 316B which comprises entity and organization specific model 308D, 308E, and 308F. Similar to in FIG. 3A, this is the most specific level, pertaining to sets of dimensions comprising organization and entity. The lattice-ordered set property of the hierarchy is visible at this tier. As the most specific models, they are the most likely to perform well, and as such have greatest precedence; a set of search results pertaining to dimensions of organization and entity covered by an entity and organization specific model 308 be ranked by said model.

FIG. 4 is a simplified illustrative example of a multi-tenant data table as part of an online system 400, according to one embodiment. In this example there are two rows and three columns. Each row represents an organization and each column represents an entity. The first row represents Company X 404 and the second row represents Company Y 402. Neither company can access the data of the other. The first column represents Accounts 406. The set of accounts containing Account ABC 412 corresponds with Company X 404 and is only accessible by users of Company X 404. The set of accounts containing Account DEF 418 corresponds with Company Y 402 and is only accessible by users of Company Y 402.

Similarly, the second column represents Contacts 408. The set of Contacts containing John Smith 414 is only accessible by users of the corresponding company, Company X 404. The set of Contacts containing Jane Doe 420 is only accessible by users of Company Y 402. A search query upon Contacts 408 by a user of Company X 404 would result in a search upon only the set of Contacts containing John Smith 414.

The third column represents Cases 410. Similar to the first and second column, each set of Cases is specific to the company on which row that set resides. The set of Cases containing UI Bug 416 is specific to Company X 404 and the set of Cases containing Late Delivery 422 is accessible only by Company Y 402, neither company being able to access the other's Cases. For example, a search upon Cases by Company Y 402 would search only the set of Cases containing Late Delivery 422.

This simplified example illustrates the concept of the multi-tenant data table. Each organization has its own space, with its own sets of data pertaining to the various entities stored in that data table. Each organization's sets of data are not accessible by users of other organizations unless special access is permitted. However, each set of data in a given column or row can be used to create an overall model, i.e. all the sets of data associated with all the entities for a given organization can be used to make an organization-specific model, and all the sets of data associated with all the organizations for a specific entity can be used to create an entity-specific model. For a model specific to organization and entity, only search results pertaining to a specific organization and a specific entity, meaning one set of data such as the set of Accounts containing Account ABC 412, is used.

Figure 5:
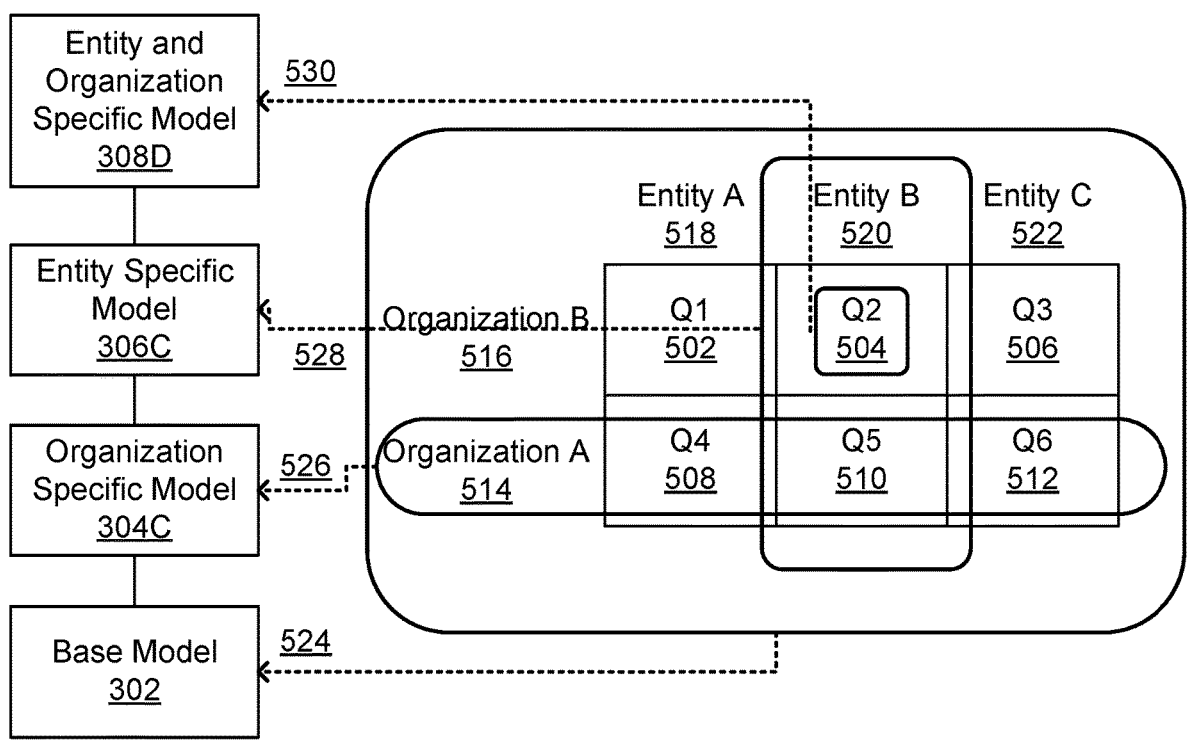
FIG. 5 is a diagram illustrating an example relationship between data in a multi-tenant data table as part of an online system and a hierarchical ranking model, according to one embodiment.

FIG. 5 is a diagram 500 illustrating an example relationship between data in a multi-tenant data table as part of an online system and a hierarchical ranking model, according to one embodiment. There are two main parts of this figure. First is the example hierarchy of models comprising base model 302, organization specific model 304C, entity specific model 306C, and entity and organization specific model 308D. Second is the multi-tenant data table comprising rows for Organization A 514 and Organization B 516, and columns for Entity A 518, Entity B 520, and Entity C 522.

There are furthermore six queries represented in the figure. Q1 502 is a search query upon Entity A 518 specifically for Organization B. Q2 504 is a query upon Entity B specifically for Organization B. Q3 506 is a query upon Entity C specifically for Organization B. Similarly, Q4 508, Q5 510, and Q6 512 are queries upon Entities A, B, and C respectively, specifically for Organization A.

Arrow 524 points to the base model 302 and indicates that the base model applies to any search query regardless of specific organization, entity, or other dimension by connecting to an encircling of the entire example multi-tenant data table. Arrow 526 points to organization specific model 304C and indicates that the organization specific model 304C is applicable to any search query constrained by the dimension of organization, such as Organization A 514 which is encircled and connected to the arrow 526. Arrow 528 points to the entity specific model 306C and indicates that such models apply to any search query constrained by the dimension of entity, such as Entity B 520 which is encircled and connected to arrow 528. Arrow 530 points to entity and organization specific model 308D and indicates that such models apply to any search query specific to the dimensions of organization and entity, such as Q2 504 which is encircled and connected to the arrow 530.

Overall Processes

The processes associated with searches performed by online system 110 are described herein. The steps described herein for each process can be performed in an order different from those described herein. Furthermore, the steps may be performed by different modules than those described herein.

Figure 6:
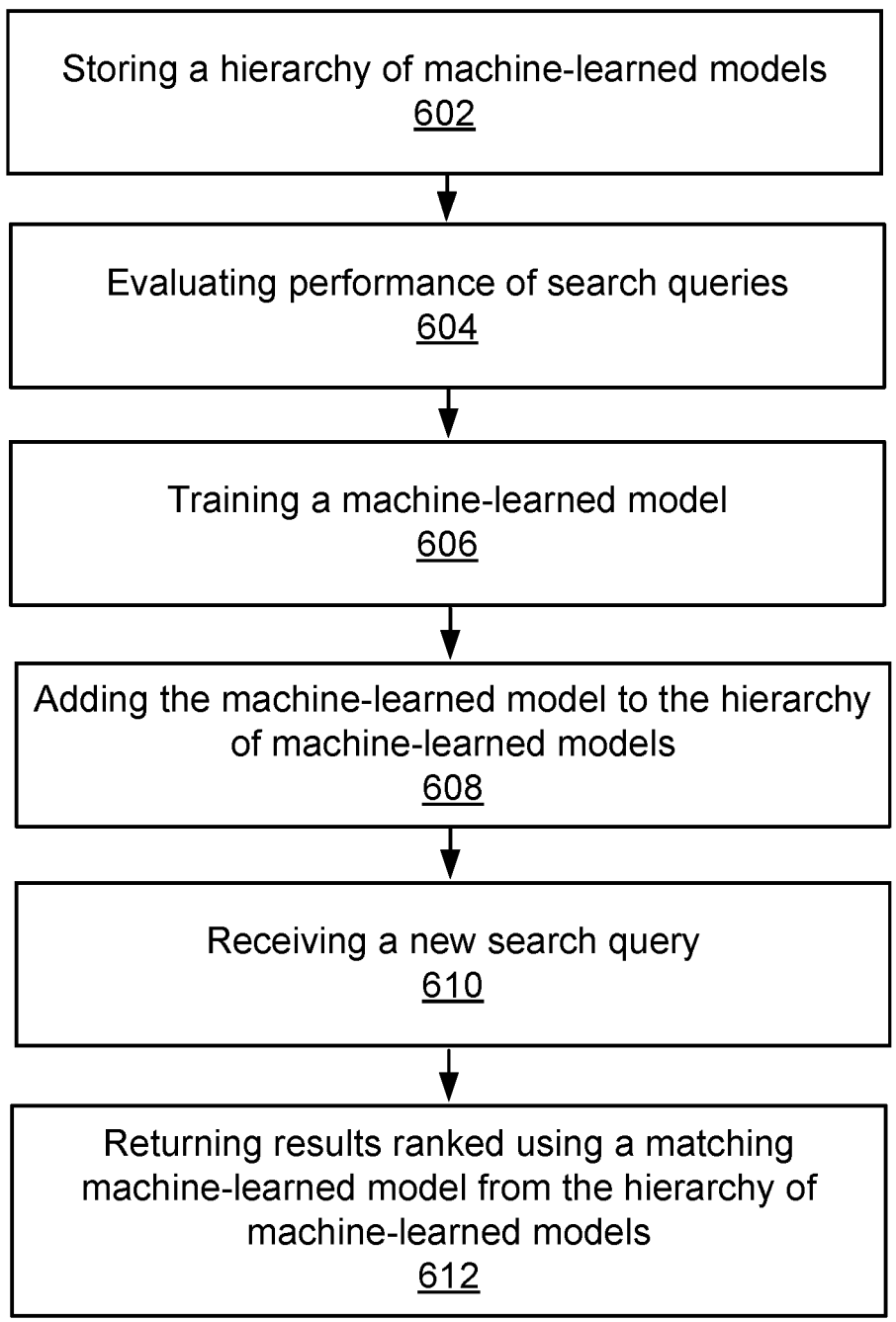
FIG. 6 illustrates the process of adding a model to a hierarchy of machine learning based search results ranking models, according to one embodiment.

FIG. 6 illustrates the process of adding a model to a hierarchical ranking model, according to one embodiment. The system stores 602 a hierarchy of machine-learned models for purposes such as ranking search results. As search queries are executed upon the data store, the search results are ranked using the historically best performing model, as determined by the performance evaluator 208; for each search query, performance 604 of the ranking applied to search results is evaluated, as detailed supra. In cases where performance is deemed unacceptably poor, a new model is generated which is specific according to a set of dimensions, such as being specific to an entity within a specific organization, thereby being associated with the set of dimensions comprising entity and organization. The new model is trained 606 using a set of data associated with the same set of dimensions as the search query which prompted the generation of said model.

After it is trained, the new machine-learned model is added 608 to the hierarchy of models at a location determined by the set of dimensions associated with said model. For example, if the model is associated with a set of dimensions comprising entity and organization, the model would be placed in the level of the hierarchy of models associated with sets of dimensions comprising entity and organization. Once a new search query associated with the same set of dimensions as the newly trained model is received 610, the system uses said model to rank the search results resulting from the execution of said search query. The newly ranked search results are then returned 612 for display to the user who created the search query.

Figure 7:
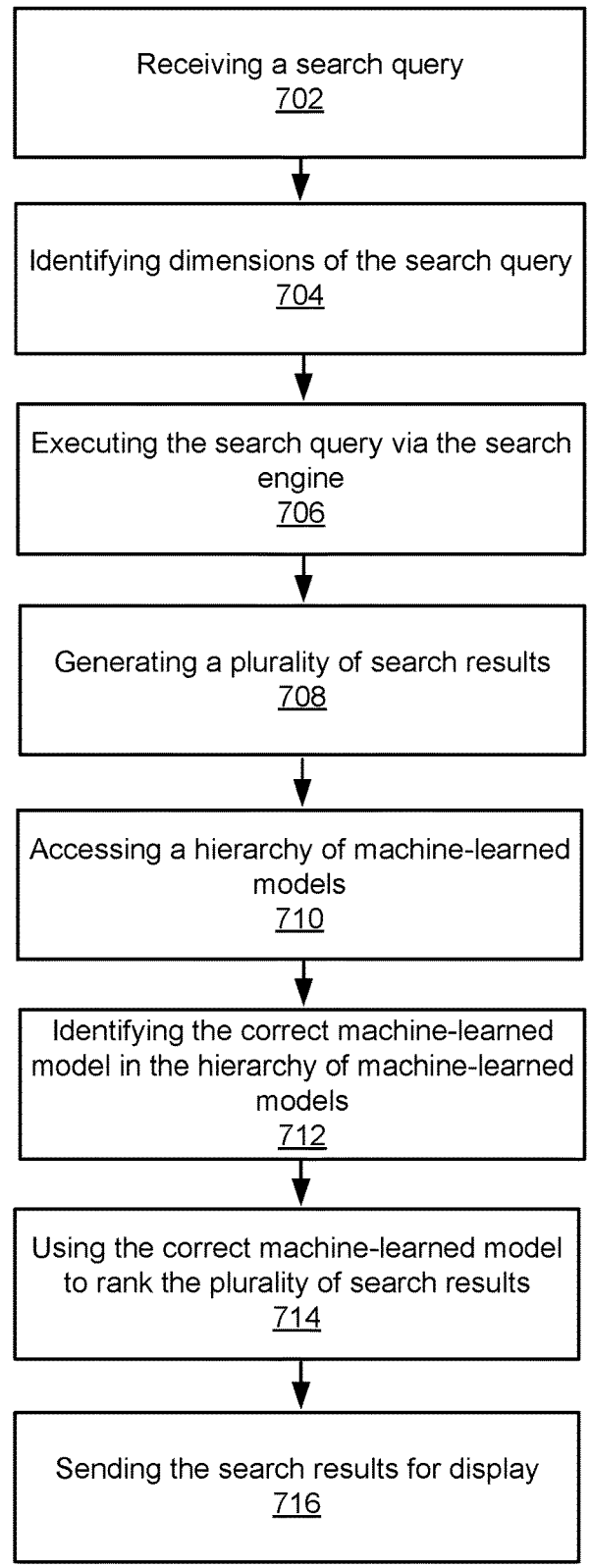
FIG. 7 illustrates the process of using a hierarchical ranking model for search result ranking in response to a search query, according to one embodiment.

FIG. 7 illustrates the process of using a hierarchical ranking model to affect search result ranking in response to a search query, according to one embodiment. First, a new search query is received 702 by the system. Upon receipt of the new search query, the set of dimensions associated with the search query is identified 704. The search query then passes through the search engine, which executes 706 the search query. This execution leads to the generation 708 of a plurality of search results. In order to rank the search results, the hierarchy of machine-learned models is accessed 710 to find a ranking model to use. The correct machine-learned model in the hierarchy of machine-learned models is identified 712 by matching the set of dimensions associated with the search query to the sets of dimensions of models in the hierarchy, finding the most appropriate model of all candidate models.

In one embodiment, the most appropriate model is the most specific model, i.e. the model with the greatest number of dimensions matching the dimensions of the search query. Not all dimensions of the search query may be used to specify the model, but all dimensions of the model must match dimensions of the search query. For example, if a search query is associated with a set of dimensions comprising organization and entity, but there are only organization specific models, the organization specific model associated with the same organization as the search query may be used, but not if it were associated with any other dimensions not present in the search query.

Once the correct machine-learned model is identified, it is used 714 to rank the plurality of search results. The ranked search results are then sent 716 for display to the user.

Computer Architecture

Figure 8:
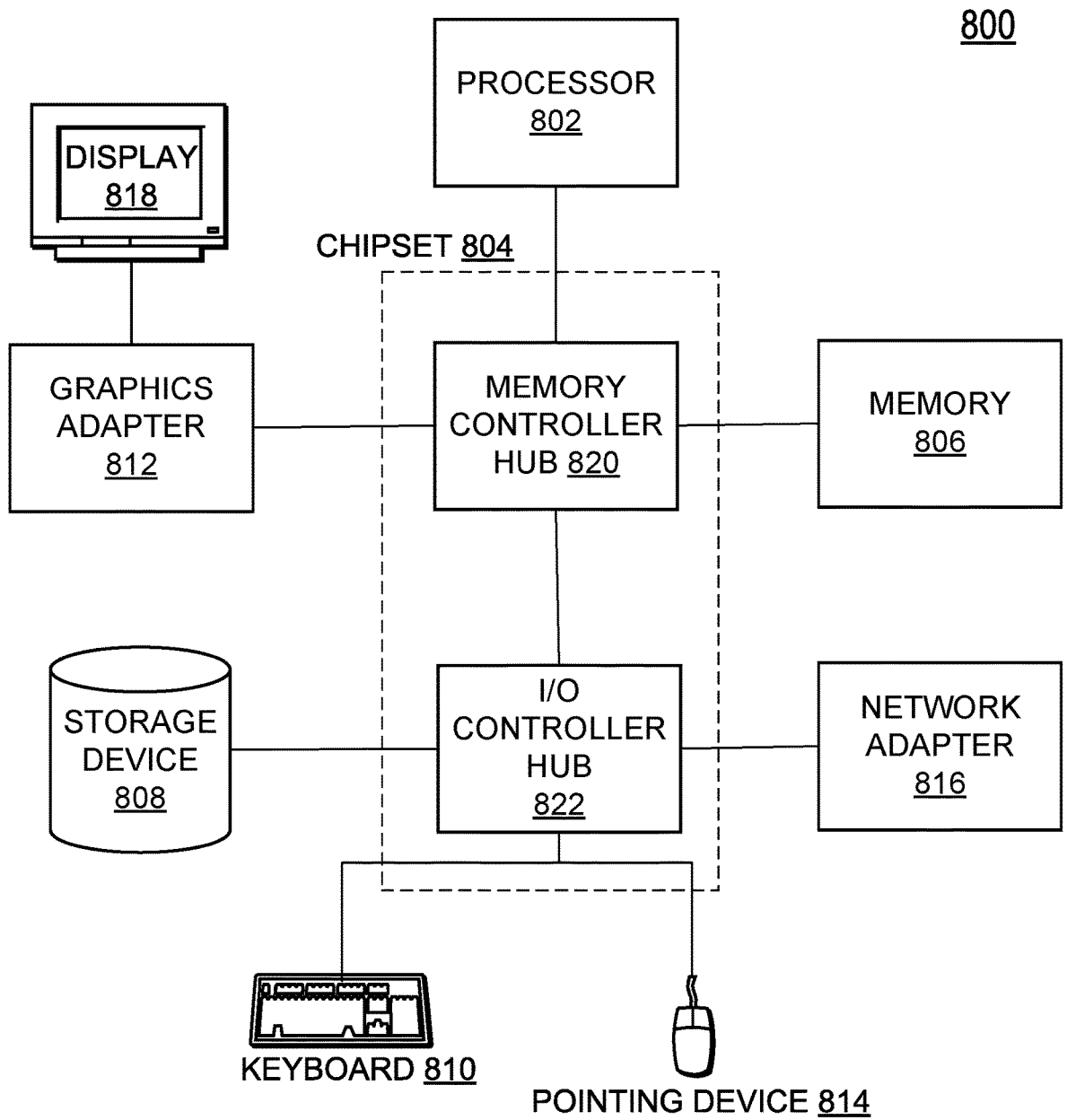
FIG. 8 is a high-level block diagram of a computer for acting as a client or online system, according to one embodiment.

The entities shown in FIG. 1 are implemented using one or more computers. FIG. 8 is a high-level block diagram of a computer 800 for acting as a client device 120 or an online system 110 in one embodiment. Illustrated are at least one processor 802 coupled to a chipset 804. Also coupled to the chipset 804 are a memory 806, a storage device 808, a keyboard 810, a graphics adapter 812, a pointing device 814, and a network adapter 816. A display 818 is coupled to the graphics adapter 812. In one embodiment, the functionality of the chipset 804 is provided by a memory controller hub 820 and an I/O controller hub 822. In another embodiment, the memory 806 is coupled directly to the processor 802 instead of the chipset 804.

The storage device 808 is any non-transitory computer-readable storage medium, such as a hard drive, compact disk read-only memory (CD-ROM), DVD, or a solid-state memory device. The memory 806 holds instructions and data used by the processor 802. The pointing device 814 may be a mouse, track ball, or other type of pointing device, and is used in combination with the keyboard 810 to input data into the computer system 800. The graphics adapter 812 displays images and other information on the display 818. The network adapter 816 couples the computer system 800 to the network 130.

As is known in the art, a computer 800 can have different and/or other components than those shown in FIG. 8. In addition, the computer 800 can lack certain illustrated components. For example, the computer acting as the online system 110 can be formed of multiple blade servers linked together into one or more distributed systems and lack components such as keyboards and displays. Moreover, the storage device 808 can be local and/or remote from the computer 800 (such as embodied within a storage area network (SAN)).

As is known in the art, the computer 800 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 808, loaded into the memory 806, and executed by the processor 802.

Alternative Embodiments

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

It is to be understood that the Figures and descriptions have been simplified to illustrate elements that are relevant for a clear understanding of the present invention, while eliminating, for the purpose of clarity, many other elements found in a typical online system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the various embodiments. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A method comprising:
   storing a hierarchy of machine-learned models, wherein machine-learned models of the hierarchy are configured to receive as input a set of search results and generate as output scores for ranking the set of search results, the hierarchy of machine-learned models comprising a plurality of levels, levels of the hierarchy associated with respective sets of dimensions describing search queries, wherein machine-learned models at a level are associated with a respective n-tuple of values corresponding to the set of dimensions for that level;
   training a particular machine-learned model using queries associated with a particular n-tuple of values;
   adding the particular machine-learned model to the hierarchy of machine-learned models in a level corresponding to the n-tuple of values;
   matching a new search query to the particular machine-learned model based on a respective set of dimensions of the search query; and
   ranking search results of the new search query using the particular machine-learned model responsive to the dimensions of the new search query matching the particular machine-learned model.

2. The method of claim 1, further comprising:
   evaluating the performance of a set of search queries;
   wherein training the particular machine-learned model is responsive to the evaluation.

3. The method of claim 2, wherein evaluating the performance of the set of search queries comprises determining a score for a model corresponding to the set of search queries based on an aggregate measure of quality of a plurality of searches performed using the model, the measure of quality of a search determined using a rank of a search result accessed by a user from a set of ranked search results provided to the user.

4. The method of claim 1, further comprising:
   training the particular machine-learned model using previous search queries and a rank of a search result that a user accessed from each set of search results provided to the user in response to one of the previous search queries.

5. The method of claim 1, wherein a first level of the hierarchy of machine-learned models comprises a base model, the base model associated with a first set of dimensions representing an empty set, the first level including a base model applicable to a plurality of entities and a plurality of organizations.

6. The method of claim 5, wherein the hierarchy of machine-learned models comprises a second level associated with a second set of dimensions including an organization dimension, wherein the second level comprises a second set of models, each model for a specific organization.

7. The method of claim 6, wherein the hierarchy of machine-learned models comprises a third level associated with a third set of dimensions including an entity type dimension, wherein the third level comprises a third set of models, each model for a specific entity type.

8. The method of claim 7, wherein the hierarchy of machine-learned models comprises a fourth level associated with a fourth set of dimensions including the organization dimension and the entity type dimension, the fourth level comprising a fourth set of models, each model for a specific organization and a specific entity type.

9. A method for ranking search results in a multi-tenant system, the method comprising:

receiving a search query from a user;
identifying a plurality of dimensions of the search query;
receiving a plurality of search results from a search engine corresponding to the search query;
accessing a hierarchy of machine-learned models, wherein machine-learned models of the hierarchy are configured to receive as input a set of search results and generate as output scores for ranking the set of search results, the hierarchy of machine-learned models comprising a plurality of levels, levels of the hierarchy associated with respective sets of dimensions describing search queries, wherein machine-learned models at a level are associated with a respective n-tuple of values corresponding to the set of dimensions for that level;
identifying a machine-learned model that matches the dimensions of the search query; and
using the identified machine-learned model to rank the search results.

10. The method of claim 9, wherein identifying the machine-learned model is responsive to an entity associated with the search query or an organization associated with the search query.

11. The method of claim 9, wherein a first level of the hierarchy of machine-learned models comprises a base model, the base model associated with a first set of dimensions representing an empty set, the first level including a base model applicable to a plurality of entities and a plurality of organizations.

12. The method of claim 11, wherein the hierarchy of machine-learned models comprises a second level associated with a second set of dimensions including an organization dimension, wherein the second level comprises a second set of models, each model for a specific organization.

13. The method of claim 12, wherein the hierarchy of machine-learned models comprises a third level associated with a third set of dimensions including an entity type dimension, wherein the third level comprises a third set of models, each model for a specific entity type.

14. The method of claim 13, wherein the hierarchy of machine-learned models comprises a fourth level associated with a fourth set of dimensions including the organization dimension and the entity type dimension, the fourth level comprising a fourth set of models, each model for a specific organization and a specific entity type.

15. A non-transitory computer readable storage medium, storing instructions for ranking search results in a multi-tenant system, the instructions for:
receiving a search query from a user;
identifying a plurality of dimensions of the search query;
receiving a plurality of search results from a search engine corresponding to the search query;
accessing a hierarchy of machine-learned models, wherein machine-learned models of the hierarchy are configured to receive as input a set of search results and generate as output scores for ranking the set of search results, the hierarchy of machine-learned models comprising a plurality of levels, levels of the hierarchy associated with respective sets of dimensions describing search queries, wherein machine-learned models at a level are associated with a respective n-tuple of values corresponding to the set of dimensions for that level;
identifying a machine-learned model that matches the dimensions of the search query; and
using the identified machine-learned model to rank the search results.

16. The non-transitory computer readable storage medium of claim 15, wherein identifying the machine-learned model is responsive to an entity associated with the search query or an organization associated with the search query.

17. The non-transitory computer readable storage medium of claim 15, wherein a first level of the hierarchy of machine-learned models comprises a base model, the base model associated with a first set of dimensions representing an empty set, the first level including a base model applicable to a plurality of entities and a plurality of organizations.

18. The non-transitory computer readable storage medium of claim 17, wherein the hierarchy of machine-learned models comprises a second level associated with a second set of dimensions including an organization dimension, wherein the second level comprises a second set of models, each model for a specific organization.

19. The non-transitory computer readable storage medium of claim 18, wherein the hierarchy of machine-learned models comprises a third level associated with a third set of dimensions including an entity type dimension, wherein the third level comprises a third set of models, each model for a specific entity type.

20. The non-transitory computer readable storage medium of claim 19, wherein the hierarchy of machine-learned models comprises a fourth level associated with a fourth set of dimensions including the organization dimension and the entity type dimension, the fourth level comprising a fourth set of models, each model for a specific organization and a specific entity type.

* * * * *